Nov. 24, 1942.  M. KNIGHT  2,303,125

DOUBLE-WALLED GLASS UNIT

Filed June 26, 1940

Inventor
MILTON KNIGHT.

By
Frank Fraser
Attorney

Patented Nov. 24, 1942

2,303,125

UNITED STATES PATENT OFFICE 2,303,125

DOUBLE-WALLED GLASS UNIT

Milton Knight, Perrysburg, Ohio, assignor to Libbey-Owens-Ford Glass Company, Toledo, Ohio, a corporation of Ohio Application June 26, 1940, Serial No. 342,474

13 Claims. (Cl. 20—565)

The present invention relates broadly to the sealing of double-walled glass units of the type including two sheets of glass arranged in spaced, substantially parallel relation, and more particularly to the provision of an improved seal for the edges of such units.

Although the invention is not restricted to use in the sealing of any particular form of glass unit, it is of especial utility in the sealing of the type of unit illustrated in the accompanying drawing and disclosed in Patent No. 2,011,252. The unit disclosed in such patent consists briefly of two spaced parallel sheets of glass, either flat or curved, having arranged therebetween a layer or mat of loose glass threads held solely by friction between the glass surfaces. This unit has excellent sound insulating and light diffusing properties and may be used as a window pane, in partition walls, etc. Such a unit is produced commercially by the assignee of the present application under the trade name "Thermolux."

It has been heretofore customary in sealing this type of unit to cut the layer or mat of glass threads relatively smaller than the glass sheets to provide a relatively narrow channel between the sheets around the marginal portions thereof and within which a plastic sealing material is inserted to seal the space between said sheets from the atmosphere.

An important object of this invention is to provide an improved form of seal for the edges of glass units of the above character which will render the space between the glass sheets both air tight and moisture tight and prevent the ingress of dirt and dust which would tend to adversely affect the appearance and cleanliness of the inner surfaces of said sheets as well as the layer or mat of glass threads arranged therebetween.

Another important object of the invention is the provision of an improved seal comprising a simple and efficient protective metal frame extending around the edges of the unit and secured to the peripheral edges of the glass sheets as well as to the outer marginal face portions thereof, if desired, by means of a special type of adhesive material.

Another important object of the invention is the provision of an improved seal associated with the glass sheets and layer of glass threads in such a manner that the layer of glass threads, instead of being cut relatively smaller than the glass sheets, is preferably of the same size or slightly larger than the said sheets so that the ends of the glass threads will be engaged by the adhesive material to more securely hold the glass threads in place so that the danger of them slipping between the glass sheets will be reduced to a minimum, the said adhesive material being also of such character that upon drying or setting it undergoes a certain amount of shrinkage, whereby the glass threads will be drawn taut or stretched to smooth out any wrinkles in the glass mat.

A further important object of the invention is the provision of a special type of adhesive material which will securely adhere to both the glass sheets and the protective metal frame; will effectively operate as a seal and prevent leakage under all working conditions; will have sufficient ductility and elasticity to accommodate the relative expansion and contraction of the glass sheets due to temperature variations, which at the maximum temperatures to which it is subjected will not become too soft and which at minimum temperatures will not crystallize or become brittle; and which may be used over a long period of time without deterioration.

Other objects and advantages of the invention will become more apparent during the course of the following description when taken in connection with the accompanying drawing.

In the drawing wherein like numerals are employed to designate like parts throughout the same:

Figure 1:
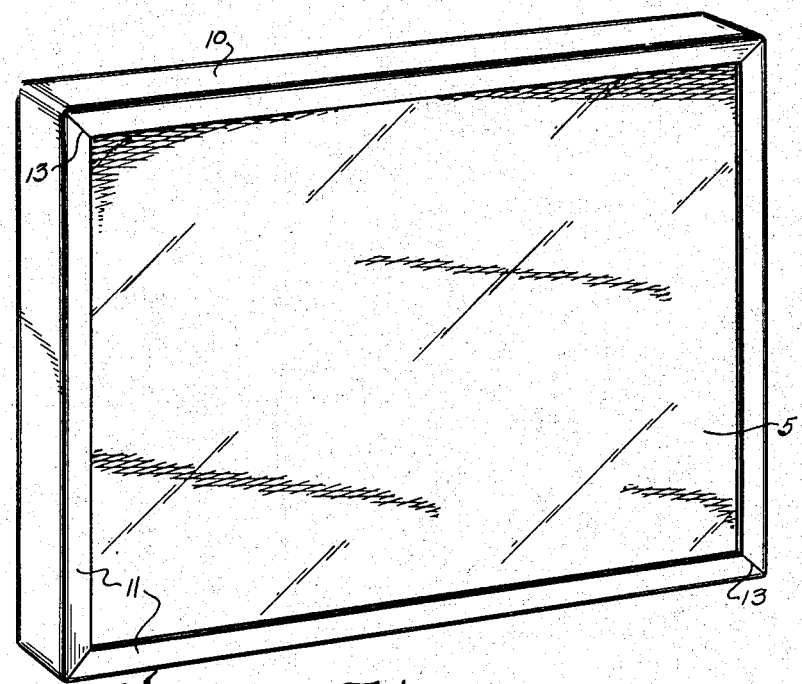
Fig. 1 is a perspective view of a double-walled glass unit marginally sealed according to the present invention.
Figure 2:
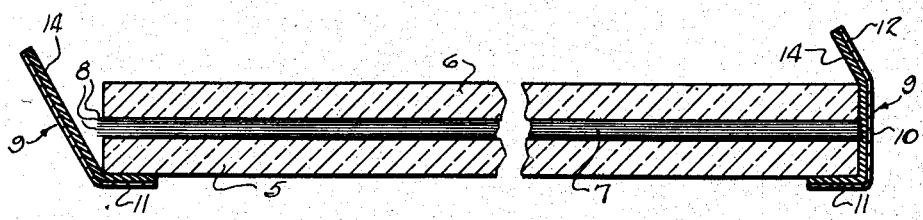
Fig. 2 is a transverse sectional view therethrough showing the application of the seal.

With reference now to the drawing, there is illustrated a double-walled glass unit comprising two spaced parallel sheets of glass 5 and 6 between which is arranged a layer or mat of glass threads 7 of predetermined thickness. The layer of glass threads is preferably loosely positioned between the glass sheets in that it is not cemented or otherwise secured to the glass surfaces. The layer of glass threads is also preferably cut either the same size as the glass sheets or slightly larger than said sheets so that the ends of the threads project beyond the edges of the glass sheets as indicated at 8 in Fig. 2.

Figure 3:
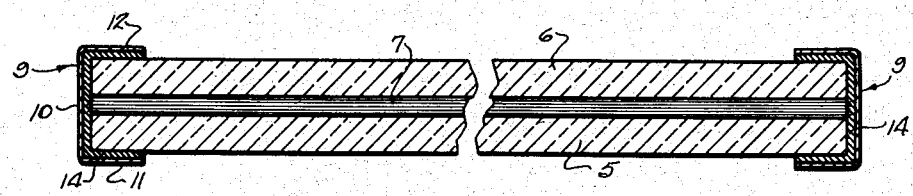
Fig. 3 is a similar view showing the seal in place.

Extending around the edges of the glass sheets 5 and 6 is a protective metal frame 9 of substantially channel formation having a base portion 10 disposed opposite the peripheral edges of the glass sheets and inturned flanges 11 and 12 disposed opposite the marginal portions of the outer faces of said sheets. The frame 9 preferably consists of a relatively soft, readily bendable metal such as lead or brass and may be in the form of a continuous strip which is adapted to be wrapped around the edges of the unit. The flanges 11 and 12 of the metal frame 9 are preferably mitered at the corners of the glass sheets as indicated at 13 to give a neater appearance as well as to facilitate the wrapping of the metal stripping around the sheets. The mitered joints 13 may be soldered if desired. The protective metal frame 9 fits over the edges of the glass sheets as shown in Fig. 3, and is secured thereto by means of a special type of adhesive material 14.

The adhesive material 14 comprises a plastic compound composed of two basic ingredients, namely, a rubber (latex) paste and a dehydrating powder. The concentrated latex paste and powder are separately prepared and then mixed together in predetermined proportions to form a plastic mix of the desired consistency. The dehydrating powder is in the form of a self-setting cement which sets up upon absorption of the water from the latex paste. The consistency of the adhesive is dependent upon the proportions of paste and powder used and may be varied over a relatively wide range.

Broadly stated, the paste comprises a specially prepared latex of high but variable concentration having a low protein content which is suitably stabilized and preserved by a relatively small amount of ammonia as well as by the use of caustic alkali. As a specific example, one form of paste which I have used with good results is a concentrated latex paste having a dry rubber content of approximately 68% to 70% and which will also ordinarily contain other solid materials amounting to approximately 1.5%. These solids, other than the dry rubber, which constitute the 1.5% are caustic alkali as well as naturally occurring proteins which are always found in latex. The proportions of these ingredients are approximately in the ratio of 0.8% protein material to 0.7% of caustic alkali calculated as potassium hydroxide. The balance of the paste consists of water containing a relatively small amount of ammonia which may be approximately 0.05%.

Summarizing and by way of example, this paste comprises the following ingredients in the approximate proportions given:

| | Per cent |
|---|---|
| Dry rubber | 68.45 |
| Water | 30 |
| Ammonia | 0.05 |
| Natural proteins | 0.8 |
| Caustic alkali (KOH) | 0.7 |

The powder consists almost entirely of a high alumina cement that sets by hydration. To this high alumina cement are added suitable and variable amounts of sulfur or other vulcanizing agents such as selenium, etc. Also, to the powder is added suitable accelerators capable of bringing about vulcanization without the application of heat such as "Butyl Zimate," zinc butyl xanthate, etc. It is likewise desirable to add to the powder in variable proportions, suitable antioxidants such as "Age-rite White," phenyl beta naphthylamine, indanyl resorcinol (sold in the trade as RR5), etc.

More particularly, the powder is composed of inorganic and organic materials, with the inorganic material comprising approximately 98% of the powder. An analysis of one form of powder used by me with excellent results in conjunction with the concentrated latex paste described above shows the inorganic material to consist of:

| | Per cent |
|---|---|
| A. Powdered sulfur | 1.0 |
| B. High alumina cement | 97.0 |

Chemical composition of typical high alumina cement:

| | |
|---|---|
| Silica ($SiO_2$) | 4.92 |
| Iron oxide ($Fe_2O_3$) | 18.2 |
| Alumina ($Al_2O_3$) | 39.17 |
| Calcium oxide (CaO) | 36.03 |
| Magnesia (MgO) | 1.54 |
| Sulfuric anhydride ($SO_3$) | .14 |

The organic constituents of the powder, which comprise an accelerator and an antioxidant, constitute substantially 2% of the powder and should be present in approximately the following proportions:

| | Per cent |
|---|---|
| Accelerator (zinc di-n-butyldithiocarbamate)* | 0.5 |
| Antioxidant ($N,N^1$ di-beta-naphthyl-p-phenyl-enediamine)** | 1½ |

\* This accelerator is sold in the trade under the name of "Butyl Zimate."
\*\* This antioxidant is sold in the trade under the name of "Age-rite White."

The composition of the powder may be summarized as follows:

| | Per cent |
|---|---|
| High alumina cement, the analysis of which is given above | 97.0 |
| Sulfur | 1.0 |
| Accelerator ("Butyl Zimate") | .5 |
| Antioxidant ("Age-rite White") | 1.5 |

The adhesive material above described is a self-setting material and loses its ability to flow freely in about forty-five minutes, so that the concentrated latex paste and dehydrating powder should not be mixed with one another until it is desired to make use of the material. The adhesive material, however, does not develop an initial set until about four hours old, and good strength or bond is ordinarily developed by the seventh day. Curing of the material, however, continues until about the fourteenth day when maximum strength has developed.

It is of course desirable to suit the consistency of the mixture to the particular sealing operation, so that the adhesive does not flow into the glass mat 7 and yet is sufficiently plastic so that it can be applied to the metal stripping. Although different proportions of powder and paste may be used, I have found that a mix of 8 parts powder and 5 parts paste by weight will give a mixture of normal consistency. Varying the mix and therefore the consistency does not alter the properties of the adhesive. In preparing the adhesive material, it is preferable that the powder be mixed into the paste with a slow, uniform motion that tends to crush any powder lumps. This may be done either in a hand operated mixer or a power driven mixer. Likewise, the mixing of the paste and powder may be carried out in a vacuum to rid the mix of entrapped air.

In the sealing of the double-walled glass unit, a flat strip of readily bendable metal of the desired length and width is first provided and the flange portions 11 and 12 thereof properly notched at spaced points along its length to provide the mitered joints 13 when the stripping is associated with the glass sheets. There is then applied to one surface of the metal stripping a layer 14 of the adhesive material above described, and the stripping then wrapped around the edges of the glass sheets preferably in the following manner. Thus, first one flange, such as flange 11, is disposed opposite the outer face of one sheet of glass, as shown at the left in Fig. 2, and adhered to the glass by the adhesive material 14. The metal stripping is then bent inwardly, as shown to the right in Fig. 2, to bring the base portion 10 thereof at substantially right angles to flange 11 and the adhesive material on said base portion into engagement with the peripheral edges of the glass sheets. The metal stripping is then wrapped around the four edges of the glass sheets, after which the flange 12 is bent inwardly into engagement with the outer face of the other sheet of glass. As stated above, the mitered joints 13 may be soldered if desired.

From the above, it will be seen that the metal stripping can be wrapped around and secured to the glass sheets in a rapid, convenient manner to form a simple and efficient protective metal frame. The metal frame serves as a protection for both the adhesive material 14 and the glass sheets. For instance, the metal frame acts to protect the edges of the glass sheets against chipping or breakage during handling and installation of the unit as well as facilitating the mounting of the unit in a framework. The metal frame also protects the adhesive material from the ultra-violet rays of the sun which may have a deleterious effect thereon as well as from putty oils, etc.

It will be noted that when the base portion 10 of the metal stripping is bent inwardly, the layer of adhesive material 14 thereon not only engages the peripheral edges of the glass sheets, but will also engage the ends 8 of the glass threads which project beyond the sheet edges. This is an important feature of the invention since, upon setting of the adhesive material, there is a tendency for it to undergo a certain amount of shrinkage or contraction, whereupon the glass threads adhering thereto will be drawn taut or stretched, resulting in the elimination of wrinkles and the formation of a glass layer or mat 7 having a smooth appearance. Further, the adherence of the glass threads to the adhesive material results in the glass threads being more securely held in place between the glass sheets so that danger of the layer or mat 7 slipping will be minimized.

The type of double-walled glass unit above described and illustrated in the drawing has been found to possess especially good sound insulating and light diffusing properties and may be used either as a window pane, as the light transmitting element of a partition wall, or for any analogous purpose. The glass sheets may be either of clear transparent glass or translucent glass, and the glass threads may be of either clear glass or colored. Throughout the specification and claims the term "glass threads" is to be understood as including glass wool, woven glass fabrics, and similar materials. In some cases, it may be desirable to have the metal stripping arranged opposite the peripheral edges only of the glass sheets which would eliminate the flanges 11 and 12, and such a modification of the protective metal frame 9 is within the purview of the present invention.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A composite article including substantially parallel sheets of glass spaced from one another, a layer of glass threads positioned between the glass sheets and being of a size substantially equal to the size of the said glass sheets, and a seal comprising a metal frame arranged around the edges of the glass sheets and secured thereto by means of a plastic adhesive material which also engages the edges of the layer of glass threads, said plastic adhesive material comprising a concentrated latex paste and a dehydrating powder mixed together in predetermined proportions to provide a self-setting plastic mix of the desired consistency.

2. A composite article including substantially parallel sheets of glass spaced from one another, a layer of glass threads positioned between the glass sheets and being of a size substantially equal to the size of the said glass sheets, and a seal comprising a metal frame arranged around the edges of the glass sheets and secured thereto by means of a plastic adhesive material which also engages the edges of the layer of glass threads, said plastic adhesive material comprising a concentrated latex paste and a high alumina cement powder that sets by hydration mixed together in predetermined proportions to provide a self-setting plastic mix of the desired consistency.

3. A composite article including substantially parallel sheets of glass spaced from one another, a layer of glass threads positioned between the glass sheets and being of a size substantially equal to the size of the said glass sheets, and a seal comprising a metal frame arranged around the edges of the glass sheets and secured thereto by means of a plastic adhesive material which also engages the edges of the layer of glass threads, said plastic adhesive material comprising a concentrated latex paste having a dry rubber content of approximately 68% to 70% and a dehydrating powder mixed together in predetermined proportions to provide a self-setting plastic mix of the desired consistency.

4. A composite article including substantially parallel sheets of glass spaced from one another, a layer of glass threads positioned between the glass sheets and being of a size substantially equal to the size of the said glass sheets, and a seal comprising a metal frame arranged around the edges of the glass sheets and secured thereto by means of a plastic adhesive material which also engages the edges of the layer of glass threads, said plastic adhesive material comprising a concentrated latex paste having a dry rubber content of approximately 68% to 70% and a cement powder having an alumina content of approximately 97% mixed together in predetermined proportions to provide a self-setting plastic mix of the desired consistency.

5. A composite article including substantially parallel sheets of glass spaced from one another, a layer of glass threads positioned between the glass sheets and being of a size substantially equal to the size of the said glass sheets, and a seal comprising a metal frame arranged around the edges of the glass sheets and secured thereto by means of a plastic adhesive material which also engages the edges of the layer of glass threads, said plastic adhesive material comprising a concentrated latex paste of relatively high but variable concentration having a low protein content and including a stabilizer and preservative, and a powder comprising a high alumina cement that sets by hydration, a vulcanizing agent, an accelerator and an antioxidant, said paste and powder being mixed together in predetermined proportions to provide a self-setting plastic mix of the desired consistency.

6. A composite article including substantially parallel sheets of glass spaced from one another, a layer of glass threads positioned between the glass sheets and being of a size substantially equal to the size of the said glass sheets, and a seal comprising a metal frame arranged around the edges of the glass sheets and secured thereto by means of a plastic adhesive material which also engages the edges of the layer of glass threads, said plastic adhesive material comprising a concentrated latex paste having a dry rubber content of approximately 68% to 70% and a stabilizer and preservative, and a cement powder containing approximately 97% alumina, a vulcanizing agent, an accelerator and an antioxidant, said paste and powder being mixed together in predetermined proportions to provide a self-setting plastic mix of the desired consistency.

7. A composite article including substantially parallel sheets of glass spaced from one another, a layer of glass threads positioned between the glass sheets and being of a size substantially equal to the size of the said glass sheets, and a seal comprising a metal frame arranged around the edges of the glass sheets and secured thereto by means of a plastic adhesive material which also engages the edges of the layer of glass threads, said plastic adhesive material comprising a concentrated latex paste of relatively high but variable concentration having a low protein content and including a relatively small amount of a stabilizer and preservative selected from the group consisting of ammonia and caustic alkali, and a powder comprising a high alumina cement, a vulcanizing agent such as sulfur, an accelerator such as "Butyl Zimate" and an antioxidant such as "Age-rite White," said paste and powder being mixed together in predetermined proportions to provide a self-setting plastic mix of the desired consistency.

8. A composite article including substantially parallel sheets of glass spaced from one another, a layer of glass threads positioned between the glass sheets and being of a size substantially equal to the size of the said glass sheets, and a seal comprising a metal frame arranged around the edges of the glass sheets and secured thereto by means of a plastic adhesive material which also engages the edges of the layer of glass threads, said plastic adhesive material comprising a concentrated latex paste having a dry rubber content of approximately 68% to 70% and a stabilizer and preservative selected from the group consisting of ammonia and caustic alkali, and a cement powder comprising approximately 97% alumina, a vulcanizing agent such as sulfur, an accelerator such as "Butyl Zimate" and an antioxidant such as "Age-rite White," said paste and powder being mixed together in predetermined proportions to provide a self-setting plastic mix of the desired consistency.

9. A composite article including substantially parallel sheets of glass spaced from one another, a layer of glass threads positioned between the glass sheets and being of a size substantially equal to the size of the said glass sheets, and a seal comprising a metal frame arranged around the edges of the glass sheets and secured thereto by means of a plastic adhesive material which also engages the edges of the layer of glass threads, said plastic adhesive material comprising a concentrated latex paste including the following ingredients in the approximate proportions:

| | Per cent |
|---|---|
| Dry rubber | 68.45 |
| Water | 30. |
| Ammonia | 0.05 |
| Natural proteins | 0.8 |
| Caustic alkali (KOH) | 0.7 | and a dehydrating powder comprising the following ingredients in the approximate proportions:

| | Per cent |
|---|---|
| High alumina cement | 97 |
| Sulfur | 1 |
| Accelerator ("Butyl Zimate") | .5 |
| Antioxidant ("Age-rite White") | 1.5 | said paste and powder being mixed together to form a self-setting plastic mix of the desired consistency.

10. A composite article including substantially parallel sheets of glass spaced from one another, a layer of glass threads filling the space between the glass sheets serving to maintain them spaced from one another and being of a size substantially equal to the size of said glass sheets, a metal frame arranged around the edges of the glass sheets, and a plastic adhesive material for securing the metal frame to the glass sheets and for also engaging the edges of the layer of glass threads to maintain said layer of glass threads in place.

11. A composite article including substantially parallel sheets of glass spaced from one another, a layer of glass threads positioned between the glass sheets, a metal frame arranged around the edges of the glass sheets, and a plastic adhesive material for securing the metal frame to the glass sheets and for also engaging the edges of the layer of glass threads to maintain said layer of glass threads in place, said plastic adhesive material being of such character and of such thickness that upon drying it undergoes a certain amount of shrinkage sufficient to cause stretching of the glass threads adhered thereto to remove wrinkles therefrom.

12. A composite article including substantially parallel sheets of glass spaced from one another, a layer of glass threads filling the space between the glass sheets serving to maintain them spaced from one another and being of a size substantially equal to the size of said glass sheets, flexible metal stripping wrapped around the edges of the glass sheets and having flange portions disposed opposite the marginal portions of the outer faces of said sheets, and a plastic adhesive material for securing the metal stripping to the peripheral edges of the glass sheets as well as to the marginal portions of the outer faces thereof and for also engaging the edges of the layer of glass threads to maintain said layer of glass threads in place.

13. A composite article including substantially parallel sheets of glass spaced from one another, a layer of glass threads positioned between the glass sheets, flexible metal stripping wrapped around the edges of the glass sheets and having flange portions disposed opposite the marginal portions of the outer faces of said sheets, and a plastic adhesive material for securing the metal stripping to the peripheral edges of the glass sheets as well as to the marginal portions of the outer faces thereof and for also engaging the edges of the layer of glass threads to maintain said layer of glass threads in place, said plastic adhesive material being of such character and of such thickness that upon drying it undergoes a certain amount of shrinkage sufficient to cause stretching of the glass threads adhered thereto to remove wrinkles therefrom.

MILTON KNIGHT.